(12) United States Patent
Nitschke et al.

(10) Patent No.: US 9,718,433 B2
(45) Date of Patent: Aug. 1, 2017

(54) APPARATUS FOR OPERATING A COLD-GAS GENERATOR FOR A VEHICLE

(71) Applicant: Robert Bosch GmbH, Stuttgart (DE)

(72) Inventors: Werner Nitschke, Asperg (DE); Hartmut Schumacher, Freiberg (DE); Ruediger Karner, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/899,014

(22) PCT Filed: Apr. 30, 2014

(86) PCT No.: PCT/EP2014/058933
§ 371 (c)(1),
(2) Date: Dec. 16, 2015

(87) PCT Pub. No.: WO2014/202270
PCT Pub. Date: Dec. 24, 2014

(65) Prior Publication Data
US 2016/0121842 A1    May 5, 2016

(30) Foreign Application Priority Data

Jun. 18, 2013 (DE) .................. 10 2013 211 421

(51) Int. Cl.
*B60R 21/274* (2011.01)
*B60R 21/017* (2006.01)
(Continued)

(52) U.S. Cl.
CPC .......... *B60R 21/274* (2013.01); *B60R 21/017* (2013.01); *B60R 21/263* (2013.01); *B60R 21/268* (2013.01); *B60R 2021/26094* (2013.01)

(58) Field of Classification Search
CPC ... B60R 21/274; B60R 21/268; B60R 21/017; B60R 2021/26094; B60R 2021/2636; B60R 2021/2633
(Continued)

(56) References Cited

U.S. PATENT DOCUMENTS 5,362,100 A    11/1994 Werbelow et al.
5,796,177 A    8/1998 Werbelow et al.
(Continued)

FOREIGN PATENT DOCUMENTS

DE    198 57 919    7/1999
DE    101 47 884    4/2013
(Continued)

*Primary Examiner* — Keith J Frisby
(74) *Attorney, Agent, or Firm* — Norton Rose Fulbright US LLP; Gerard Messina

(57) ABSTRACT

A cold gas generator for a vehicle includes a container for storing gas, and an outlet opening closed by a closure element. The apparatus for operating the cold gas generator has a first terminal for a first connecting line for providing a first operating voltage potential, and a second terminal for a second connecting line for providing a second operating voltage potential. The apparatus also has an electrical coil to actuate, in response to a coil current, a closure device for controlling a gas flow through the outlet opening, the coil being connected between the first terminal and the second terminal. The apparatus also has a firing device to open the closure element in response to a firing current, the firing device being connected between the first terminal and the second terminal.

23 Claims, 7 Drawing Sheets

(51) Int. Cl.
    *B60R 21/263*     (2011.01)
    *B60R 21/268*     (2011.01)
    *B60R 21/26*     (2011.01)

(58) Field of Classification Search
    USPC ................ 280/735, 736, 737; 102/530, 531; 701/45
    See application file for complete search history.

(56) References Cited

U.S. PATENT DOCUMENTS

| | | |
|---|---|---|
| 5,820,162 A | 10/1998 | Fink |
| 2015/0361942 A1* | 12/2015 | List ........................ F02D 41/22 307/24 |

FOREIGN PATENT DOCUMENTS

| | | |
|---|---|---|
| DE | 10 2011 087077 | 5/2013 |
| DE | 102011089147 A1 | 6/2013 |

\* cited by examiner

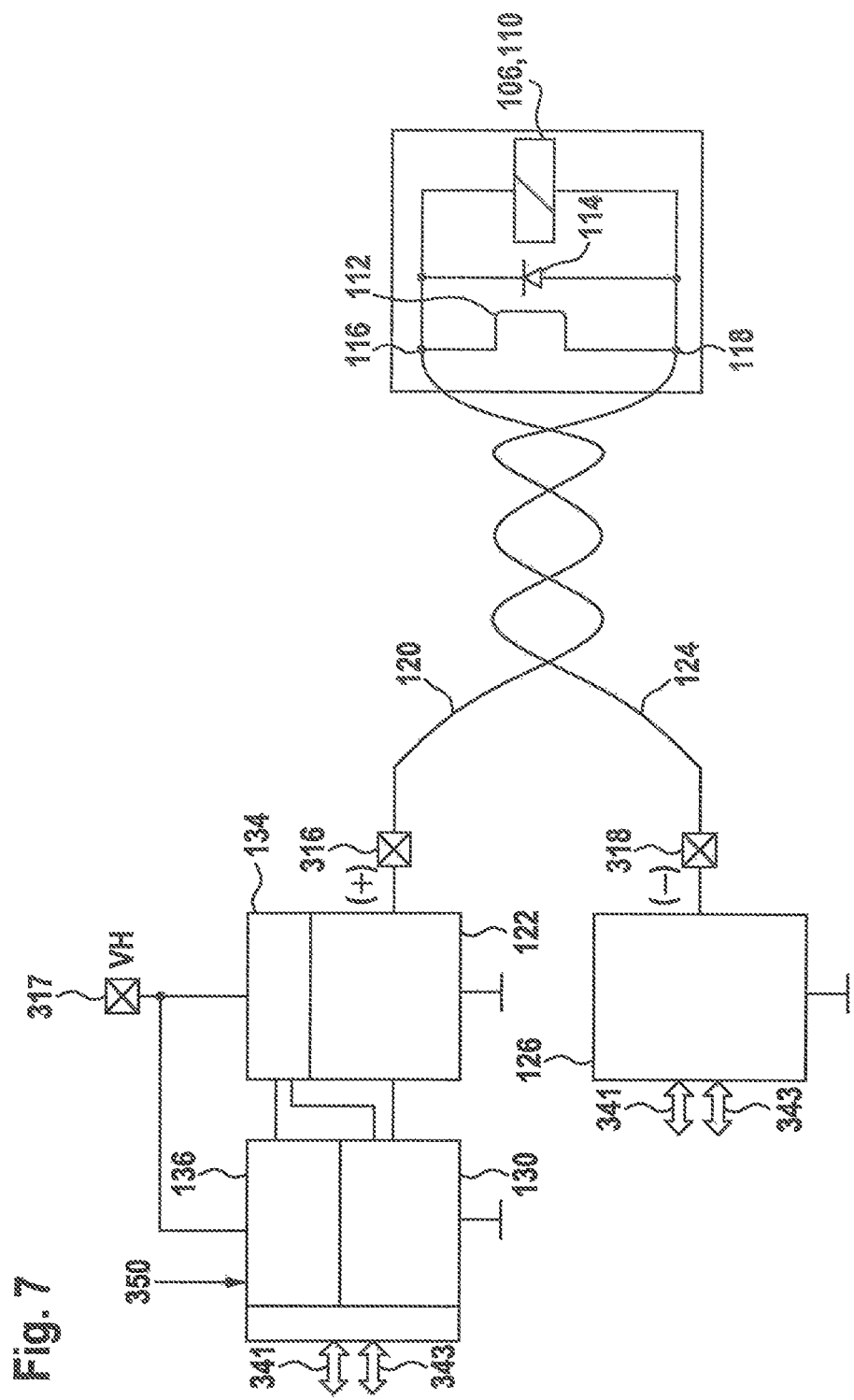

APPARATUS FOR OPERATING A COLD-GAS GENERATOR FOR A VEHICLE

FIELD OF THE INVENTION

The present invention relates to an apparatus for operating a cold gas generator for a safety device for a vehicle, to a safety device for vehicle, and to a method for controlling an apparatus for operating a cold gas generator.

BACKGROUND INFORMATION

Cold gas generators are used for example in side airbags. In these systems, a gas such as nitrogen that is under high pressure, for example 300 bar to 1200 bar, is made to flow into the airbag through a closure device that opens pyrotechnically. The pyrotechnic firing circuit of cold gas generators is not different electrically from the firing circuits of conventional hot gas generators.

SUMMARY OF THE INVENTION

Against this background, the present invention provides an apparatus for operating a cold gas generator for a safety device for vehicle, a safety device for a vehicle, and a method for controlling an apparatus for operating a cold gas generator according to the main descriptions herein. Advantageous embodiments result from the respective sub-descriptions herein and from the following description.

An outlet opening of a container of a cold gas generator can be closed by a closure element and additionally by a closure device. The closure element can be permanently opened using a firing device. The closure device can be made so as to be capable of closing again, so that the container can be closed again after the opening of the closure element. In order to operate the cold gas generator, i.e. in order to let gas out of the container of the cold gas generator, it is thus necessary for both the closure element and the closure device to be open in order to enable gas to exit from the container. The closure device can be actuated using a coil.

The closure device can be realized such that after the opening of the closure element a defined base flow rate of gas flows out, and through the actuation of the closure device this flow rate can be varied between a minimum value (base flow rate) and a maximum value.

Through suitable wiring of the firing device for opening the closure element and the coil for actuating the closure device, two connecting lines can suffice for the controlling of the firing device and for the controlling of the coil.

Advantageously, a flow of the gas out of the container of the cold gas generator can be controlled by the closure device. In this way, for example a filling quantity, or a temporal curve of an inflation of an airbag filled using the cold gas generator, can be controlled. Thus, an adaptation of a safety device, for example an airbag, is possible without requiring a multi-stage configuration made up of a plurality of gas generators in order to adapt the filling quantity. Here, for the adaptation using a cold gas generator, the function for opening the closure element, for example a membrane opening function, can be separated from a function of a through-flow controlling by the closure device, the two functions being capable of being activated together using only two connecting lines.

An apparatus for operating a cold gas generator for a safety device for a vehicle, the cold gas generator having a container for storing gas and the container having an outlet opening for the gas closed by a closure element, has the following features:

a first terminal for a first connecting line for providing a first operating voltage potential, and a second terminal for a second connecting line for providing a second operating voltage potential;

an electrical coil fashioned to actuate, in response to a coil current, a closure device in order to control a flow of gas through the outlet opening, the coil having a first coil contact and a second coil contact and being connected between the first terminal and the second terminal;

a firing device that is fashioned to fire in response to a firing current in order to open the closure element, the firing device having a first firing contact and a second firing contact and being connected between the first terminal and the second terminal; and a diode having an anode contact and a cathode contact, the diode being connected between the first terminal (cathode) and the second terminal (anode).

The vehicle can for example be a passenger vehicle, a truck, or a motorcycle. A safety device can be understood to be a device of the vehicle that is fashioned to protect the passengers, the vehicle, or other traffic participants from injury or damage. This includes for example a roll bar, an active engine hood, an active vehicle seating system, a device for tightening a safety belt, or an airbag. The safety device can deploy its protective effect through activation by gas flowing out from the container of the cold gas generator. Because the outlet opening of the container is closed by the closure element, the gas under pressure can be permanently stored in the container until the closure element is opened. An opening of the closure element can be irreversible.

The first terminal and the second terminal can represent a two-wire interface. Via the first and the second connecting line, the first and the second terminal can be connected to a voltage supply device. Here, "connected" can be understood as meaning connected in electrically conductive fashion. Such an electrically conductive connection can be realized as a direct connection, for example via an electrical line or printed conductor.

The closure device can represent an inductive actuator, for example in the form of a magnetic valve. The electrical coil can be part of the closure device. The coil can be fashioned to actuate, in response to the coil current flowing through the coil, the closure device in such a way that the closure device opens the outlet opening of the container. In addition, the coil can be fashioned so that, after an operating voltage that produces the coil current is switched off, the coil continues the flow of current in the original direction through self-induction. The current induced by the coil, or an induced voltage resulting therefrom, can be released through a freewheeling diode. In addition, the current induced by the coil can be guided through the firing device and can be used as firing current for the firing device.

A firing device can be understood for example as a bridge firing device or a priming cap. The firing device can have a wire that is heated by the firing current. Through the heating of the wire, a flammable agent can be ignited, which can provide further heat or energy for opening the closure element.

The diode can be connected in parallel or in series to the firing device. In the series connection, the anode contact of the diode can be oriented toward the second terminal, and the cathode contact can be oriented toward the first terminal.

For example, the anode contact can be connected to the second terminal directly or via the firing device (not yet fired).

According to a specific embodiment, the firing device and the diode are connected in series between the first terminal and the second terminal. For example, the first firing contact can be connected to the first terminal or the second firing contact can be connected to the second terminal. The diode can prevent current from continuing to flow through the firing device after firing of the firing device, should the firing device continue to be electrically conductive after the firing.

In such a specific embodiment the device can have a free-wheeling diode, for example realized as a suppressor diode (TAZ, or also TVS: Transient Absorption Zener diode), connected between the second terminal and the second operating voltage potential. Via such a freewheeling diode, a current induced by the coil through self-induction can be (further) released after a release via the firing element of the firing device after the firing thereof, and probable interruption, is no longer possible. The breakdown voltage of the suppressor diode is selected so as to have a safety interval from the highest vehicle voltage, but to be less than the maximum permissible voltage at the blocked low side.

In addition or alternatively, the apparatus can have a further suppressor diode (TAZ, or also TVS: Transient Absorption Zener diode) connected in parallel to the firing device and in series to the diode. The two diodes are configured so as to be poled oppositely relative to one another. Via the series circuit of the two diodes, a current induced by the coil can be released through the breakdown operation of the suppressor diode, when the firing element is electrically interrupted.

In addition or alternatively, the apparatus can have a further diode that is connected to the second operating voltage potential (ground) by the anode terminal of the diode between a terminal contact connected to the second connecting line and a device for providing the second operating voltage potential. In other words, between the terminal contacts of the device (low-side output stage), a diode (suppressor diode) can be connected to ground by the anode terminal.

Alternatively, the suppressor diode can be situated at an alternative location.

According to a specific embodiment, the diode can be connected parallel to the coil and parallel to the firing device, between the first terminal and the second terminal. Such an exemplary embodiment enables a rapid firing of the firing device. Via the diode, a current induced by the coil can be released. In this specific embodiment, however, an increased current has to be provided so that current flows both to the firing element and also to the coil of the magnetic valve of the closure device. According to a specific embodiment, a further diode (suppressor diode) can be provided that is connected parallel to the firing device and in series to the diode, the anode of the further diode being connected to the first firing contact of the firing device and to the first terminal. The cathode of the further diode is connected to the second firing contact. This contact in turn is connected to the cathode of the diode, and this diode is connected to the second terminal.

The apparatus can have a first device for providing the first operating voltage potential and a second device for providing the second operating voltage potential. A terminal contact of the first device can be connected to the first terminal via the first connecting line, and a terminal contact of the second device can be connected to the second terminal via the second connecting line. The first device can include a voltage source. The second device can be realized as a ground terminal. The first device can include a high-side switch, for example in the form of a transistor. The second device can include a low-side switch, for example in the form of a transistor. "High-side" can mean that the devices assigned to the high side in a current circuit are configured in a direction of flow of current from an energy source to a ground potential before the coil. Correspondingly, "low-side" can mean that the devices assigned to the low side in a current circuit are configured in a direction of flow of current from an energy source to a ground potential after the coil.

The apparatus can have an acquisition device that is fashioned to acquire a value of a current flowing through the first terminal. The acquisition device can be realized as a current measuring device.

The value of the current can be a current strength, for example given in mA. For example, the acquisition device can be fashioned to acquire a current fed into the first terminal. In addition, the apparatus can have a setting device that is fashioned to set the current as a function of the value. For example, the setting device can be fashioned to interrupt the current or to enable it. In addition, the setting device can be fashioned to set a current strength. The apparatus can in addition have a determining device that is fashioned to determine, as a function of the value of the current, a time duration during which the closure element and the closure device release the outlet opening in order to permit gas to flow out through the outlet opening. For example, the determining device can be fashioned to start or to continue a counter for determining the time duration when the value of the current reaches a threshold value. In this way, a quantity of the gas flowing out from the container can be acquired without requiring a pressure sensor or flow sensor.

According to a specific embodiment, the setting device can be fashioned to connect the first terminal to the first operating voltage potential via the first connecting line and to connect the second terminal to the second operating voltage potential via the second connecting line, until the value of the current reaches a maximum threshold value. In addition, the setting device can be fashioned to separate the first terminal from the first operating voltage potential and to separate the second terminal from the second operating voltage potential, for example galvanically, or in particular by blocking the high-side current regulator and the low-side transistor after the value of the current has reached the maximum threshold value. The maximum threshold value can indicate a current strength that is required to store enough energy in the coil to produce the firing current.

Correspondingly, the coil can be fashioned to provide the firing current for firing the firing device, after the value of the current has reached the maximum threshold value and the first terminal has been separated from the first operating voltage potential and the second terminal has been separated from the second operating voltage potential. In this way, separate lines for controlling the firing device and the coil are not required.

According to a specific embodiment, the setting device can be fashioned to reconnect at least once, in response to an opening signal, the first terminal to the first operating voltage potential via the first connecting line, and the second terminal to the second operating voltage potential via the second connecting line, for example galvanically or in particular by controlling the high-side and low-side transistors after the value of the current has fallen below a threshold value for the coil current for the actuation of the closure device. In this way, the closure device can be opened and closed again multiple times, and in this way a flow of gas from the container can be interrupted or enabled multiple times. The opening signal can for example be provided by a central control device or by the determining device.

A safety apparatus for a vehicle has the following features:
a cold gas generator having a container for storing gas, the container having an outlet opening for the gas, closed by a closure element;
a closure device for controlling a flow of gas through the outlet opening of the container between a minimum value (0, or base flow rate) and a maximum value (maximum flow rate); and
a named apparatus for operating the cold gas generator, the coil of this apparatus being fashioned to actuate the closure device.

Optionally, the safety apparatus can have a bypass that permits a base flow rate of gas from the container when the closure element is open.

In this way, the approach according to the present invention can advantageously be used together with a cold gas generator for activating a safety device, for example of a vehicle.

A method for controlling an apparatus for operating a cold gas generator for a safety device for a vehicle, the cold gas generator having a container for storing gas and the container having an outlet opening for the gas, closed by a closure element, and the apparatus having a first terminal for a first connecting line for providing a first operating voltage potential and a second terminal for a second connecting line for providing a second operating voltage potential, and having an electrical coil that is fashioned to actuate, in response to a coil current, a closure device for controlling a flow of gas through the outlet opening, the coil having a first coil contact and a second coil contact and being connected between the first terminal and the second terminal, and having a firing device that is fashioned to fire, in response to a firing current, in order to open the closure element, the firing device having a first firing contact and a second firing contact and being connected between the first terminal and the second terminal, and having a diode having an anode contact and a cathode contact, the diode being connected between the first terminal and the second terminal, has the following steps:
Connection of the first terminal to the first operating voltage potential and of the second terminal to the second operating voltage potential in order to produce a flow of a current between the first terminal and the second terminal; and
Separation of the first terminal from the first operating voltage potential and of the second terminal from the second operating voltage potential after a value of the current has reached a maximum threshold value in order to enable a flow of the firing current through the firing device.

According to a specific embodiment, the steps of connection and separation can be carried out as follows:
connection (galvanically or in particular by controlling the high-side current regulator and low-side transistor) of the first terminal to the first operating voltage potential, and of the second terminal to the second operating voltage potential, in order to produce a flow of a current between the first terminal and the second terminal, in order to enable an immediate flow of the firing current through the firing device and, more strongly after the firing, through the coil of the closure device; and separation (blocking [{low-ohmic} connecting of gate to second operating potential, or {low-ohmic} connecting of gate to source of the high-side current regulator and (blocking [{low-ohmic} connecting of gate to second operating potential, or {low-ohmic} connecting of gate to source of the low-side transistor) of the first terminal from the first operating voltage potential and of the second terminal from the second operating voltage potential, after a value of the current has reached a maximum threshold value (I_Fmax>I_AFmin)) for a defined time duration (t>T_AF), in order to reduce the current level through the closure device, through freewheeling operation via the diode, back under the holding current, and to close the closure device again.

In this way, the connection can be carried out galvanically or by controlling the high-side current regulator and low-side transistor. The separation can take place through a blocking. Here, the gate can be connected to the second operating potential, for example in low-ohmic fashion, or the gate can be connected to the source of the high-side current regulator, for example in low-ohmic fashion. In addition, for this purpose the gate can be connected to the second operating potential, for example in low-ohmic fashion, or the gate can be connected to the source of the low-side transistor, for example in low-ohmic fashion.

Alternatively, the step of separation can be carried out as follows:
separation (galvanically or in particular through blocking [gate connected {low-ohmically} to second operating potential, or gate connected {low-ohmically} to source] of the high-side current regulator) of the first terminal from the first operating voltage potential, and separation of the second terminal (galvanically or in particular through blocking [gate connected {low-ohmically} to second operating potential, or gate connected {low-ohmically} to source] of the low-side transistor) from the second operating voltage potential, after a value of the current has reached a maximum threshold value, in order to enable a flow of the firing current through the firing device.

In the step of connection, the connection can take place galvanically or in particular through controlling of the high-side current regulator and low-side transistor. In addition, the connection can take place in order to enable an immediate flow of the firing current through the firing device and, more strongly after the firing, through the coil of the closure device.

In the step of separation, the following can be carried out: blocking [{low-ohmic} connecting of gate to second operating potential, or {low-ohmic} connecting of gate to source of the high-side current regulator and (blocking [{low-ohmic} connecting of gate to second operating potential, or {low-ohmic} connecting of gate to source of the low-side transistor). The separation can be carried out after a value of the current has reached a maximum threshold value (I_Fmax>I_AFmin)) for a defined time duration (t>T_AF), in order to reduce the current level through the closure device, through freewheeling operation via the diode, back under the holding current, and to close the closure device again.

By feeding in the current up to the value specified by the maximum threshold value, sufficient energy for opening is brought into the coil of the closure device, and also, through the forced release of this energy in freewheeling operation (separation [galvanically or in particular through blocking of the high-side current regulator and low-side transistor] of the terminals from the operating voltage potential), into the firing element of the firing device, whereby the closure element irreversibly opens. In this way, for the first time there is an open closure element and, with a temporal overlap, an open closure device.

In the present context, an apparatus can be understood as a piece of electrical equipment that processes sensor signals and, as a function thereof, outputs control signals and/or data signals. The apparatus can have an interface that can be fashioned as hardware and/or as software. In the case of a realization as hardware, the interfaces can for example be part of a so-called system ASIC that contains a wide variety of functions of the apparatus. However, it is also possible for the interfaces to be separate integrated circuits, or to be made up at least partly of discrete components. In the case of a realization as software, the interfaces can be software modules present for example on a microcontroller alongside other software modules.

Also advantageous is a computer program product having program code that can be stored on a machine-readable carrier such as a semiconductor memory, a hard drive memory, or an optical memory, and that is used to carry out the method as recited in one of the specific embodiments described above when the program product is executed on a computer or on a device.

In the following, the present invention is explained in more detail in relation to examples, on the basis of the accompanying drawings.

BRIEF DESCRIPTION OF THE DRAWINGS

FIG. 7 shows a schematic representation of a device for operating a cold gas generator according to an exemplary embodiment of the present invention.

DETAILED DESCRIPTION

Figure 1:
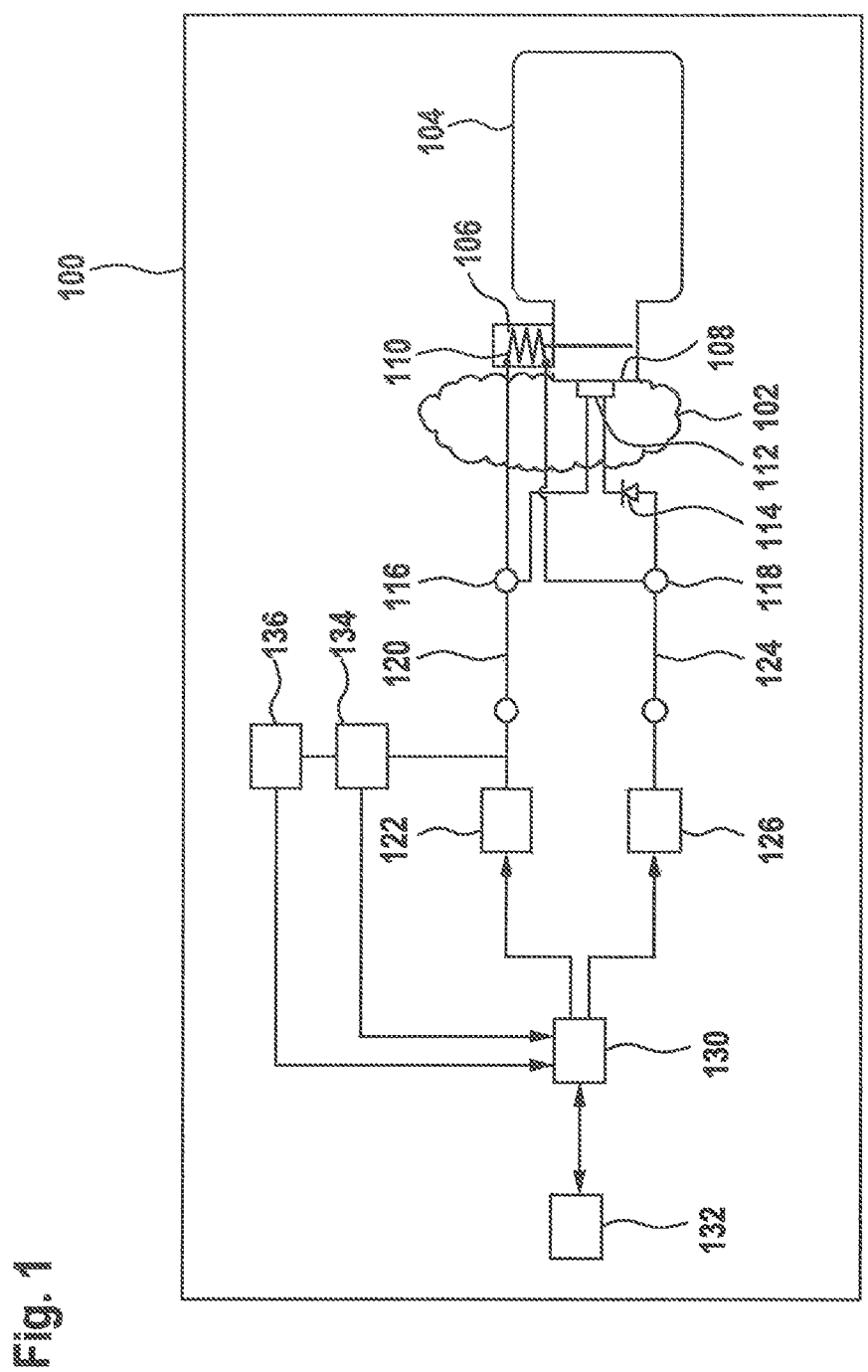
FIG. 1 shows a schematic representation of a vehicle having a safety system according to a specific embodiment of the present invention.

In the following description of advantageous exemplary embodiments of the present invention, identical or similar reference characters are used for elements shown in the various Figures having similar function, and repeated description of these elements is omitted.

FIG. 1 shows a schematic representation of a vehicle 100 having a safety system according to an exemplary embodiment of the present invention. The safety system has a safety device, here shown as an example in the form of an airbag 102, and a cold gas generator for filling airbag 102 with gas.

The cold gas generator has a container 104. In the state ready for operation of the cold gas generator, a gas under pressure is stored in container 104. An outlet opening of container 104 is closed in gas-tight fashion by a closure device 106, for example a magnetic valve, and a closure element 108, for example a membrane or disc. For the operation of the cold gas generator, closure device 106 and closure element 108 are to be opened. Closure element 108 is constructed in such a way that after opening it remains permanently open. Closure device 106 is constructed in such a way that after an opening it can be closed again. The closure device can also have a bypass that, independently of the opening of the closure device, enables a base flow rate when the closure element is open (offset).

In addition, the safety system has an apparatus for operating the cold gas generator. The apparatus is fashioned to enable a flow of gas through the outlet opening of container 104 from container 104 into airbag 102. According to this exemplary embodiment, the apparatus is fashioned to adapt the flow of gas, for example controlling an overall quantity of the gas flowing out, or a temporal course of the gas flow. In this way, the safety system can be configured adaptively. For example, the apparatus can be fashioned to actuate the cold gas generator in response to a vehicle collision, and subsequently to control a curve of the gas outflow as a function of a type or course of the collision.

According to this exemplary embodiment, the apparatus for operating the cold gas generator has a coil 110, a firing device 112, a diode 114, and a first terminal 116 and second terminal 118. Coil 110, firing device 112, and diode 114 can be connected with various wiring configurations between first terminal 116 and second terminal 118. According to the exemplary embodiment shown in FIG. 1, coil 110 is connected in parallel to a series circuit of diode 114 and firing device 112.

Coil 110 is coupled to closure device 106 or is part of closure device 106, and is fashioned to actuate closure device 106 or a closing part of closure device 106. If adequate current is supplied to coil 110, then closure opening 106 opens the outlet opening of container 104. If the supply of current to coil 110 is terminated, then the outlet opening is closed again by closure device 106, for example driven by a reset spring. Depending on the embodiment, the closure can take place until a null gas flow, i.e. no flow of gas, is reached, or until a base flow rate, specified by a bypass opening, is reached.

Firing device 112 is coupled to closure element 108 and is fashioned to open closure element 108 when a firing current flows through firing device 112.

According to this exemplary embodiment, diode 114 is provided to prevent, after firing of firing device 112, a flow of current through the branch of firing device 112 (firing element of firing device 112 can be short-circuited) when a current for actuating closure device 106 is fed into first terminal 116. Diode 114 is in addition provided in order to enable firing of firing device 112 through freewheeling operation (energy release) of the coil (112) energy. Alternatively, diode 114, situated at a different location, can be provided as a pure freewheeling diode to enable a flow of current generated by induction by coil 110.

According to an exemplary embodiment, the apparatus for operating the cold gas generator has in addition a first connecting line 120 via which first terminal 116 is connected in electrically conductive fashion to a device 122 for providing a first operating voltage potential, here an operating voltage. In addition, the apparatus has a second connecting line 124 via which second terminal 118 is connected in electrically conductive fashion to a device 126 for providing a second operating voltage potential, here ground. Device 122 for providing the first operating voltage potential and device 126 for providing the second operating voltage potential can be controlled by a setting device 130. Setting device 130 can be fashioned to receive a signal from a central control device 132, for example an airbag control device of the vehicle, indicating for example that a collision of vehicle 100 has occurred, and can be fashioned to control devices 122, 126 in response to the signal.

If through devices 122, 126 a first and second operating voltage potential are applied to terminals 116, 118, then through the voltage difference between terminals 116, 118 a coil current through coil 110 is produced. Relative to the voltage difference, diode 114 is poled in the blocking direction, so that no current flows through firing device 112. If the first and second operating voltage potential are separated from terminals 116, 118 through devices 122, 126, then a voltage is induced through coil 110 that produces, through the diode 114, also acting as freewheeling diode, a firing current through the firing element of firing device 112. If the firing element is fashioned such that a short-circuit after activation can be excluded, there is also the (alternative) possibility of connecting diode 114 parallel to coil 110 (cathode in the direction of terminal 116), which acts only as a freewheeling diode for the coil (110) energy, so that no relevant firing current can arise when the coil (112) current is shut off.

This solution requires a one-time higher current output of device 122 in order to provide, at the beginning, firing current for the firing device (112) and the coil (110) of the closure device (106) in order to provide current to this device.

According to an exemplary embodiment, the apparatus for operating the cold gas generator in addition has an acquisition device 134 that is fashioned to acquire a value, here a current strength, of a current outputted through the first connecting line into connection point 116. This can be a current that is produced by applying the first and second operating voltage potential to terminals 116, 118. Acquisition device 134 can be fashioned to provide the value of the current or a signal representing a value of the current for example to setting device 130 or to a determining device 136. Here, acquisition device 134 can be fashioned to provide the value or a corresponding signal continuously or when one or more specified threshold values are reached. For example, setting device 130 can be fashioned to separate (galvanically or in particular through blocking of the high-side current regulator and low-side transistor) the first and second operating voltage potential from terminals 116, 118 when the value of the current reaches or exceeds a threshold value.

Determining device 136 is fashioned to determine a time duration during which closure element 108 and closure device 106 release the outlet opening in order to permit gas to flow out through the outlet opening. Here, determining device 136 is fashioned to determine the time duration as a function of the value of the current acquired by acquisition device 134. For example, determining device 136 can be fashioned to start a counter when the determined value of the current reaches or exceeds a threshold value, and optionally one or more further conditions are met. Correspondingly, determining device 136 can be fashioned to stop the counter when the determined value of the current reaches or falls below a threshold value, and in addition or alternatively one or more further conditions are met. In addition, determining device 136 can be fashioned to determine, from the state of the counter or from the time duration, a gas quantity that has flowed out from container 104. Specified parameters, for example relating to the cold gas generator and/or airbag 102, can enter into the determination of the gas quantity (e.g., an offset quantity additionally emitted through a bypass of closure device 106). Determining device 136 can be fashioned to provide for example a signal representing the time duration, the counter state, or the gas quantity to setting device 130 or to control device 132. For example, setting device 130 can be fashioned to provide the operating voltage potentials again to terminals 116, 118, if the quantity of gas that has flowed out up to that point is not yet sufficient.

Depending on the specific embodiment of the apparatus for operating the cold gas generator, described elements of the apparatus can also be realized as part of the cold gas generator or of the control apparatus.

The depicted circuit can be used in various specific embodiments for an airbag 102 having cold gas pressure vessel 104. Here, the number of firing circuits 120, 124 can be reduced from four or more lines, for example to not more than two lines 120, 124.

Figure 2:
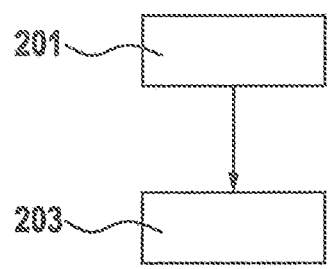
FIG. 2 shows a flow diagram of a method for operating a cold gas generator for a safety device according to an exemplary embodiment of the present invention.

FIG. 2 shows a flow diagram of a method for operating a cold gas generator for a safety device according to a specific embodiment of the present invention. The method can be used in connection with the safety system shown in FIG. 1.

In a step 201, two terminals of a parallel circuit of a coil and a firing device, as shown in FIG. 1, are connected between a first operating voltage potential and a second operating voltage potential. In this way, a flow of current is produced between the terminals. Depending on the wiring of the coil and of the firing device, the flow of current can cause the activation of a closure device that can be actuated by the coil, and, additionally or alternatively, to the firing of the firing device.

In a step 202, the terminals of the operating voltage potentials are separated (galvanically or in particular through blocking of the high-side current regulator and low-side transistor) when the current flow reaches the maximum threshold value. According to an exemplary embodiment, a current thereupon induced by the coil is conducted through the firing device as firing current. In addition or alternatively, the induced current can be conducted through a freewheeling diode.

Figure 3:
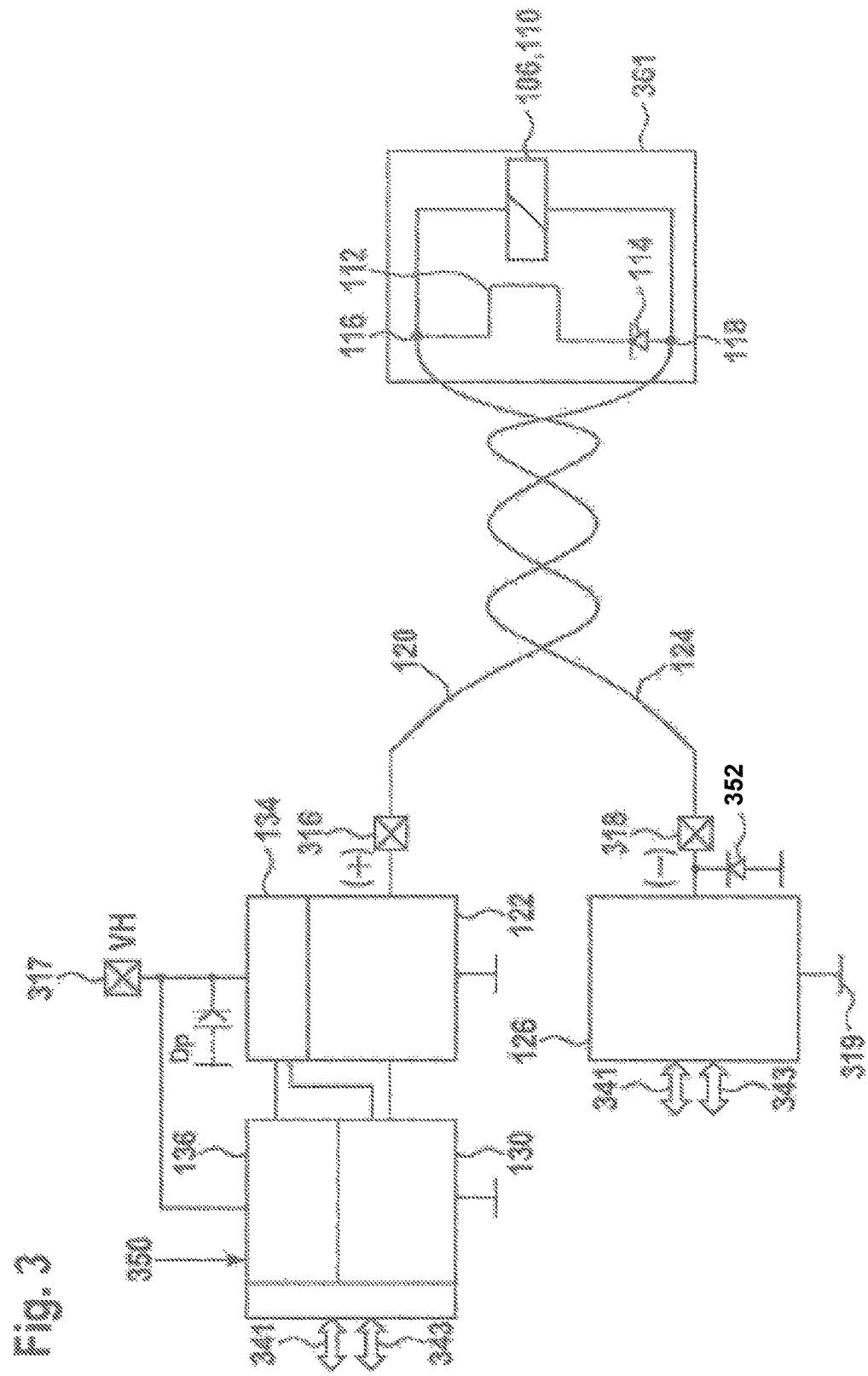
FIG. 3 shows a schematic representation of a device for operating a cold gas generator according to an exemplary embodiment of the present invention.

FIG. 3 shows a schematic representation of an apparatus for operating a cold gas generator according to an exemplary embodiment of the present invention. Corresponding to the exemplary embodiment shown in FIG. 1, the apparatus has, between a first terminal 116 and a second terminal 118, a parallel circuit of a firing device 112 and a coil 110 of a closure device 108. A diode 114 is connected in series with firing device 112. An anode contact of diode 114 is connected to second terminal 118. A cathode contact of diode 114 is connected to a terminal of firing device 112. A further terminal of firing device 112 is connected to first terminal 116. A terminal of coil 110 is connected to first terminal 116 and a further terminal of coil 110 is connected to second terminal 118.

First terminal 116 is connected via a first line 120 to a terminal contact 316, here a positive contact, of a device 122 for providing a first operating voltage potential 317. Second terminal 118 is connected via a second line 124 to a terminal contact 318, here a negative contact, of a device 126 for providing a second operating voltage potential 319. According to this exemplary embodiment, device 122 for providing a first operating voltage potential is realized as a high-side current regulator, and has a transistor. According to this exemplary embodiment, device 126 for providing a second operating voltage potential 319 is realized as a low-side output stage, and has a transistor. Device 126 has a microcontroller interface (μC) 341 and a further interface (SCON)

343 (instead of two interfaces, it is also possible for one to be used in common). Device 126 is fashioned to connect (controlled via interfaces 341, 343) terminal contact 318 to second reference potential 319, realized as ground.

Device 122 for providing the first operating voltage potential 319, here in the form of a voltage VH, is connected via an acquisition device 134, realized according to this exemplary embodiment as a device for current measurement, to a voltage source for providing the first reference voltage potential 317. Device 134 is connected via lines to a determining device 136 and a setting device 130. According to this exemplary embodiment, determining device 136 is realized as a current counter. Determining device 136 is fashioned to receive a clock pulse 350 via a pulse input. According to this exemplary embodiment, setting device 130 is realized as a current regulator and as a device for specifying a target value. Setting device 130 is connected via one or two lines to device 122, and is realized to connect—controlled via a control logic unit connected to a further microcontroller interface (μC) 341 and to a further interface (SCON) 343, as well as data from devices 134, 136—terminal contact 316 to first reference voltage potential 317.

A further diode 352, realized as a freewheeling suppressor diode (transient absorption Zener diode), is connected between contact terminal 318 and second operating voltage potential 319. The breakdown voltage (Zener voltage) is selected to be significantly higher than the vehicle operating voltages (27 to 36 V), but below the permissible maximum voltage of low-side output stage 126. The cathode of further diode 350 is connected to contact terminal 318.

According to an exemplary embodiment, the firing device is realized as a priming cap 112 and the closure device is realized as a magnetic valve 110. The priming cap can be used for pyrotechnic membrane opening, for example of a container of a cold gas generator. Magnetic valve 110 can be used as a flow controller for, for example, gas flowing out from such a container. Diode 114 acts as a selection diode for blocking and as a freewheeling diode for inductive energy dissipation. Further diode 352 acts as a freewheeling suppressor diode for inductive energy release after interruption of the firing element of the firing device.

The described circuit having a membrane opening function using a pyrotechnic firing circuit, and having magnetic valve technology for flow control, can be and is realized, according to the depicted exemplary embodiments, with only one two-wire interface 120, 124.

Two-wire interface 120, 124 for activating the pyrotechnic membrane opening function as well as the valve controlling for adaptive flow control is described in more detail in the following on the basis of an exemplary embodiment.

In FIG. 3, the basic configuration of a two-wire interface 120, 124 of the firing circuit is shown. In a block 361, magnetic valve 106 for flow control of the cold gas is configured parallel to a pyrotechnic firing device 112 with a diode 114 in series. Diode 114 is connected in such a way that given activation of the firing circuit, i.e. activation of device 126 (low-side power stage "ON"), as well as the activation of device 122 (high-side current regulator "active"), first a current buildup takes place in magnetic valve 106. Because diode 114 is blocking, current does not flow through firing device 112, shown electrically active through the priming cap. With recognition of a current level I_Fmax (current fire max), corresponding to a maximum threshold value, in device 134 for current acquisition of the high-side output stage with devices 122, 134, the switching off of the high-side output stage takes place through gate connection to ground via an active gate transistor. The recognition of current strength I_Fmax is stored as proof.

The energy stored in magnetic valve 106 is now released via freewheeling diode 350 and the priming cap resistance of firing device 112. The definition of I_Fmax and the inductance of magnetic valve 106 are made such that after a sufficiently short time, for example 0.1 ms to 2 ms, typically 300 μs, priming cap 112 fires before the current strength falls below a current I_AFmin (current all fire min) of priming cap 112.

With the condition I>=I_Fmax and the high- and low-side output stage "ON," in device 136 a first counter is started with a step width of 10 μs to 50 μs. There then follows the switching off of high- and low-side output stages 122, 126. With the condition I>=I_AFmin and the high- and low-side output stages 122, 126 "OFF," the first counter is stopped. The state of the first counter represents in the worst case firing time T_F (shown in FIG. 4) of priming cap 112. For a precise firing time T_F, the slope of the decreasing current I, which the high-side output stage continues to output after being switched off, is to be observed (step width 10 μs to 50 μs); if there is a drastic change in slope (425) (factor 2 to 8), the firing element is interrupted and the membrane is open, and under this condition counter 1 is to be stopped.

With the firing of priming cap 112, the membrane of the cold gas reservoir standing under pressure is opened. Magnetic valve 106 is also opened, because a current I_ON, at which magnetic valve 106 reliably opens, is smaller than I_Fmax, and holding current I_H, at which magnetic valve 106 remains open, is selected smaller than I_AFmin. A first quantity of cold gas flows out and fills an airbag.

If, with its activation, priming cap 112 interrupts the freewheeling current of magnetic valve 106, which is what happens in the normal case, there then takes place a compulsory freewheeling via the immersed high-side output stage 122 (negative source) and suppressor diode 150. If the current in magnetic valve 106 falls below holding current I_H, then the flow of gas into the airbag is blocked, or, if a bypass of the closure device is present, is taken back to a base value.

The forced freewheeling of magnetic valve 106 by voltage VH of first operating voltage potential 317 via high-side output stage 122, magnetic valve 106, and suppressor diode 350 are acquired by a second counter in device 136 under the following start conditions:

High-side output stage 122 is logically disconnected, i.e. the gate is connected to ground via a holdout transistor, and current I<=I_AFmin.

The second counter is incremented with a step width of 10 μs to 50 μs as long as the current is above holding current I_H of magnetic valve 106.

The state of the second counter includes a negligibly small portion of the firing time T_F of priming cap 112, as well as time T1 in which gas flows into airbag 102 through open closure device (magnetic valve) 106, as well as, if present, through a bypass.

As already in the case of counter 1, the error caused by portions of firing time T_F in counter state 2 can be completely avoided if the start takes place through the above-indicated stop condition of counter 1.

Corresponding to the requirements of an individual crash that for example causes activation of the airbag, after a waiting period there takes place a new controlling of magnetic valve 106 through activation of high-side and low-side output stages 122, 126.

Current regulator 130 of high-side output stage 122 receives as specification (regulating value) the value I_ONd, which corresponds to a current value for magnetic valve 106 "ON," i.e. corresponds to actuated magnetic valve 106, including the measurement tolerance of the current acquisition (required proof) independent of the regulator.

When I_ON is exceeded, magnetic valve 106 is definitely open, and a second quantity of cold gas flows out. After the start conditions are met: high-/low-side "ON" and I>=I_ON with a step width of 10 µs to 50 µs, the time duration of the gas outflow is checked to see if I_H is exceeded, and the duration of the exceeding is recorded in a third counter of device 136.

The third counter shows duration T2 of the opening of magnetic valve 106, in which the second gas quantity flows into the airbag.

These processes for the portioned emission of cold gas can be continued multiple times, for example n times.

FIG. 3 shows an exemplary embodiment of a two-wire interface 120, 124 between the airbag control device and actuator 361 with magnetic valve 106. Here, the airbag control device is represented only by the blocks immediately necessary for controlling, measuring, and regulating.

In a block of the high-side output stage that includes devices 130, 136 as well as the control logic unit connected between devices 130, 136 and interfaces 341, 343, the command of a microcontroller via interface 341 for activating the connected actuator system 361 is converted, coordinated by the control logic unit, into an n-stage current regulating specification, assuming as precondition a release of the safety controller (SCON).

The current that is conducted from a voltage 317 (VH), usually an energy reserve voltage and/or battery voltage, into the high-side transistor of device 122, under some circumstances via a safety semiconductor, is measured in a block that includes device 134. The current measurement value or values are used for current regulation and for current counting in devices 130, 136.

The current outputted from the high side via terminal contact 316 is guided via a line 120 of two-wire interface 120, 124 to actuator 361, and back to low-side output stage 126 toward ground 319. Low-side output stage 126 is also under the control of the microcontroller, and of the enabling device (SCON), via interfaces 341, 343.

Figure 4:
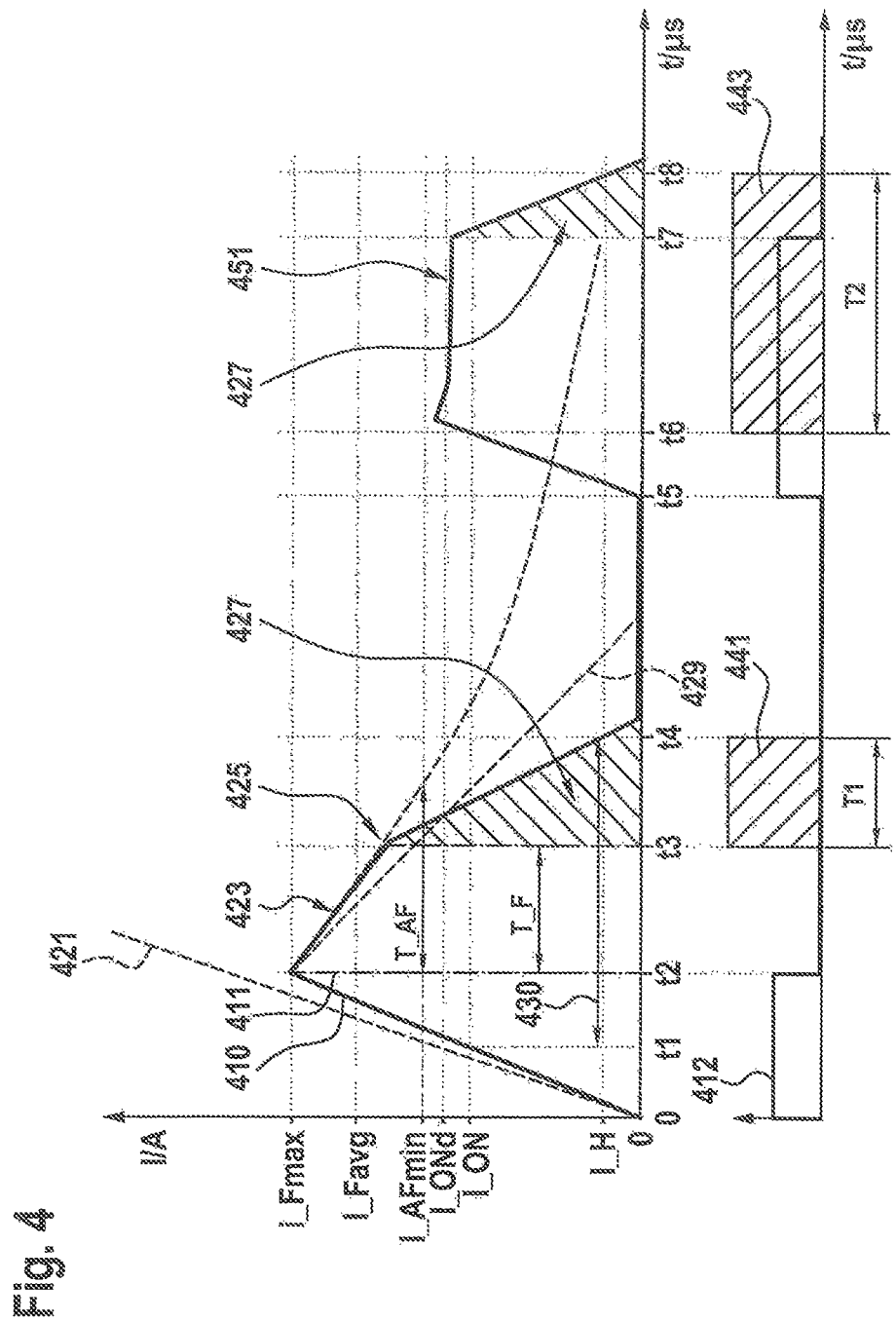
FIG. 4 shows a signal curve of a method for operating a cold gas generator according to an exemplary embodiment of the present invention.

FIG. 4 shows a signal curve 410 of a current that results from the execution of a method for operating a cold gas generator according to an exemplary embodiment of the present invention. This can be a method executed using the devices described on the basis of FIG. 3.

On the ordinate, time is plotted in microseconds. On the abscissa, current is plotted in amperes. A plurality of current threshold values are plotted. The value I_H corresponds to a current at which the magnetic valve just opens. The value I_ON corresponds to the current at which the magnetic valve reliably opens. The value I_ONd corresponds to a current plus a measurement tolerance at which the magnetic valve reliably opens (required proof). The value I_AF min corresponds to a minimum current for the reliable specified firing of the firing device. The value I_Fmax corresponds to a maximum current.

In the diagram, a current curve 411 is also plotted in freewheeling operation over the firing device.

In addition, FIG. 4 shows a further signal curve 412 that shows the times in which the devices shown for example in FIG. 3 for providing the operating voltage potentials, which can be realized for example as high-side stage and low-side stage, are active or inactive.

At time 0, the devices for providing the operating voltage are switched active (high/low side "on"), whereby, via the two-wire interface, a voltage difference is applied between the first and second terminal of the actuator system, whereby current 410 increases to the value I_Fmax within the time period between 0 and t2. Current 410 can be a current flowing through the coil of the magnetic valve of the actuator system. When value I_Fmax is reached at time t2, the devices for providing the operating voltage potentials are switched inactive (high/low side "off"), whereby current 410 falls to the value 0 within the time period between t2 and t4.

Between the times 0 to t4 there are shown, with regard to the curve of current 410, a tangent 421, a segment 423 during which a firing current flows through the firing device, an increase in current slope 425 at which the priming cap fires and a membrane of the gas container opens, a segment 427 of freewheeling operation over a suppressor diode operated in breakdown mode, and a forced-open high-side switch, as well as a further tangent 429.

A time period T_AF that begins at t2 is a time period during which current 411 can have at least the value I_AFmin for the worst case firing of the firing device. A time period T_F acquired by the first counter (precise counting, current slope-controlled) identifies, starting from t2, an individual time duration up to the firing of the firing device. A time duration 430 identifies a time period between t1 and t4 during which the magnetic valve is open. At time t4 current 410 falls below value I_H, and the magnetic valve closes.

Between t3 and t4, the magnetic valve is open and the firing device has already fired, so that during a time span T1 a first cold gas quantity 441 can flow out (or a gas quantity 441 that is additional to the bypass).

At time t5, which is at a temporal distance from time t4, the devices for providing the operating voltage potentials are again switched active (high/low side "on"), and current 410 increases, with an overshoot, to value I_ONd, whereby current 410 exceeds value I_ON, and the magnetic valve is again opened. At time t7, the devices for providing the operating voltage potentials are switched inactive (high/low side "off"), whereby current 410 falls to the value 0. A segment 451 of the curve of current 410 identifies a magnetic valve current regulation.

At time t8, current 410 falls below value I_H and the magnetic valve closes. Between t6 and t8 the magnetic valve is open, so that during a time span T2 a second cold gas quantity 443 can flow out.

In the following, the signal curve shown in FIG. 4 is described in detail. Reference is made to the elements shown in FIG. 3. In the signal curve shown in FIG. 4, at time 0 the low side and the high side are controlled.

In detail, the low side is controlled a few microseconds before the high side. The current curve in the two-wire interface conforms to the voltage VH, the gate source voltage of the N channel MOSFET high-side output stage (without charge pump), the resistances of the go-and-return line, the magnetic valve resistance, and the activation resistance rdson of the low-side output stage, as well as the inductance of the magnetic valve. Thus, it is described by an exponential function, which in the depicted range is the same as a straight line 421.

Example

VH=33 V, VGS=3 V, MV_L=3 mH; MV_R=2 ohms; R_go_return=0.2 ohms, rdson_L=1 ohm, Tch1=3 mH/3.2 ohms=937 µs;

$$Ich1=(VH-VGS)/R\_go\_return)+MV\_R+rdson\_L)=9.375\ A$$

$$I=Ich1\times[1-\exp(-t/Tch1)]=9.375\ A\times[1-\exp(-t/937\ \mu s)]$$

If the current reaches the regulation specification I_Fmax (e.g. 2.5 A), the high-side and low-side output stage are switched off at time t2. The current over the high and low side is now commuted in the freewheeling circuit made up of the magnetic valve, freewheeling diode, and priming cap. The energy in the magnetic valve is reduced and converted in the priming cap. The firing current of the priming cap first assumes the peak value I_Fmax, and then decreases due to the energy release in the magnetic valve. The parameters priming cap resistance, magnetic valve resistance, magnetic valve inductance, and I_Fmax were chosen such that, after a short fire time T_F during which the fire current flows, the priming cap can be activated.

In the worst case, it should be possible to ensure for T_AF (all fire firing time), a current greater than I_AF (all fire current).

Current curve 411 in freewheeling operation over the priming cap is described by an exponential function.

Example $I(t2)=I\_Fmax=2.5$ A, MV_L=3 mH, MV_R=2 ohms; R_zp=2 ohms; Tdch1=3 mH/4 ohms=750 µs $$I=I\_Fmax\times[\exp(-(t-t2)/Tdch1)]=2.5\ A\times[\exp(-(t-t2)/750\ \mu s)]\ \text{for}\ t>=t2$$

The fire time≈T_F is acquired using a counter having step width 10 µs to 50 µs.
 Start condition: I>=I_Fmax and high/low side "ON"
 Stop condition: I>=I_AFmin and high/low side "OFF"
Alternatively, the precise time T_F can be determined with acquisition of the jump in current slope at the moment of priming cap activation 425 as counter stop condition.

With the activation of the priming cap, in the normal case the freewheeling circuit is interrupted, R_zp=∞. The current in the priming cap goes to zero (t3). Because the energy in the magnetic valve is still not yet released, this release is to take place via a further freewheeling circuit. For this purpose, the block having freewheeling diode 350 as suppressor diode shown in FIG. 3 is added. The inductive current of the magnetic valve is now, although it is logically deactivated through a gate-ground connection, released back toward ground via the high-side output stage (source goes to negative), the magnetic valve, and the suppressor diode. Here, the current to operating voltage potential VH can originate from the energy reserve and/or the battery or ground:

It originates from ground if, using a safety semiconductor, the energy reserve voltage and/or the battery voltage are separated from operating voltage potential VH. This ground connection then takes place via a parasitic or added diode Dp as shown in FIG. 3. Given a choice of the freewheeling diode breakdown voltage of from 24 V to 60 V, typically 27 V, the current in the magnetic valve falls off quickly between t3 and t4. Here again the curve is an exponential function.

Time≈T1, in which first gas quantity 441 flows into the airbag, is acquired by a counter having step width 10 µs to 50 µs (specified by a clock pulse signal).
 Start condition: I<=I_AFmin and high/low side "OFF";
 Stop condition: I<=I_H and high/low side "OFF";
Alternatively, time T1 can be acquired precisely if the stop condition of fire time counter T_F of the priming cap, formed from the increase in slope of current 410 at priming cap activation moment 425, is used as start condition.

After a waiting period, the high/low side is again controlled at time t5 (if present, the safety semiconductor between the energy reserve and/or VBAT is also closed; a few microseconds before the high/low side.

In this phase, the regulating current specification for the high-side output stage is changed to I_ONd. It now conforms to the required ON current for activating the magnetic valve.

In detail, regulation to a somewhat higher level than is necessary takes place in order to provide the proof of sufficient current for opening the magnetic valve, including all tolerances, in the independent current counter branch.

At time t7, the high/low side output stages are switched off and, if present, the safety semiconductor between the energy reserve and/or VBAT.

The current in the magnetic valve is now released in freewheeling operation between t7 to t8. The freewheeling circuit corresponds to the freewheeling operation between t3 and t4.

Time T2, in which the magnetic valve is open and second gas quantity 443 flows into the airbag, is acquired by a counter having step width 10 µs to 50 µs (specified by a clock pulse signal).
 Start condition: High/low side "ON" and I>=I_ON.
 Stop condition: High/low side "OFF" and I<=I_H
The process of the valve controlling can further be repeated n times, if necessary for the crash and the airbag configuration.

The counters are made such that the individual valve opening times are acquired. The fire times T_F of the priming caps are also acquired. The counter states, and start/stop conditions, can be read out by the microcontroller via the microcontroller interface.

Figure 5:
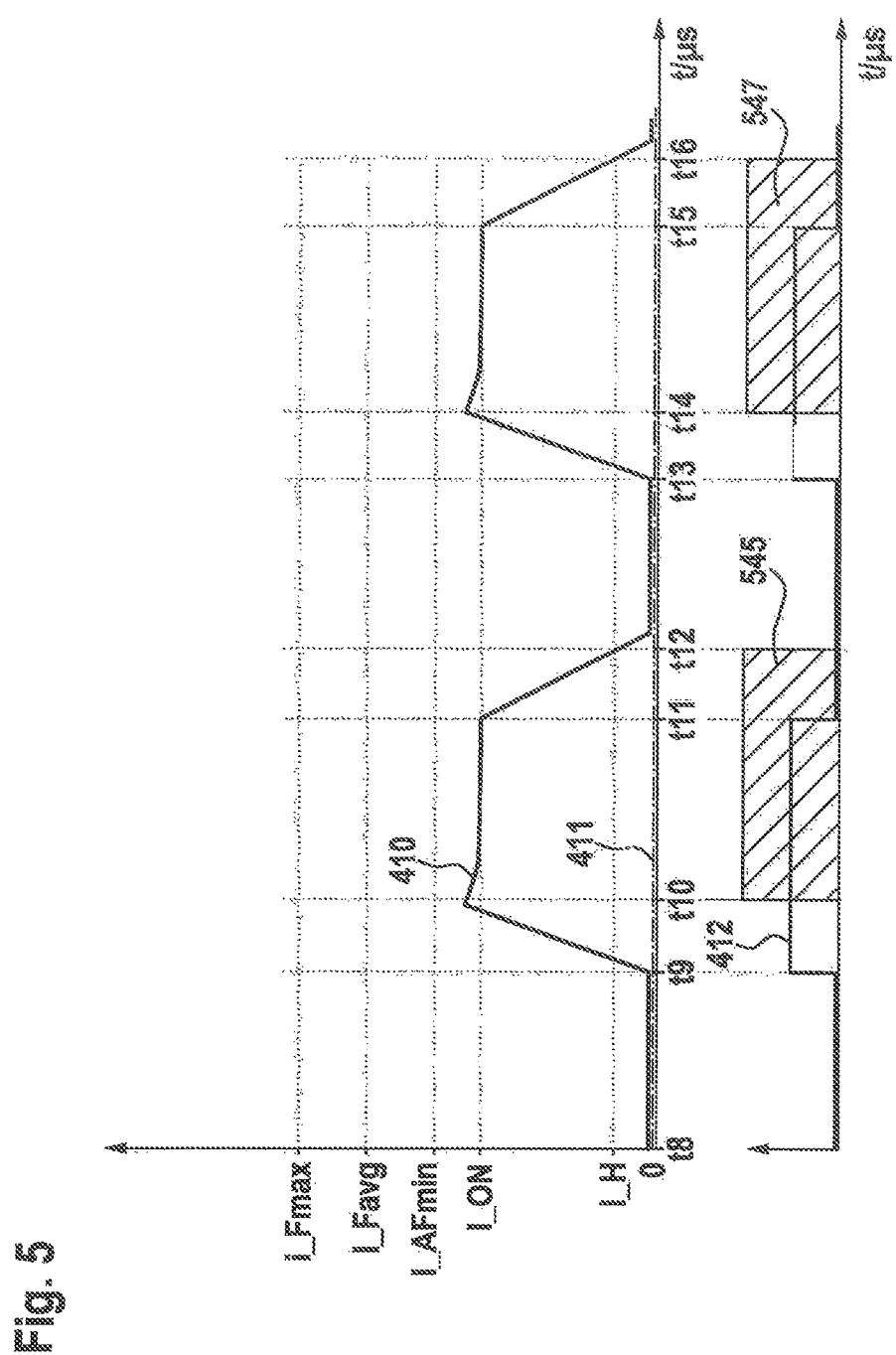
FIG. 5 shows a signal curve of a method for operating a cold gas generator according to an exemplary embodiment of the present invention.

FIG. 5 shows a signal curve following the signal curve shown in FIG. 4 of current 410 according to an exemplary embodiment of the present invention. Shown are two further time periods t9 to t11 and t13 to t15, during which the devices for providing the operating voltage potentials are again switched active (high/low side "on"), whereby during time period t10 to t12 a third cold gas quantity 545 can flow out, and during time period t14 to t16 a fourth cold gas quantity 547 can flow out.

Figure 6:
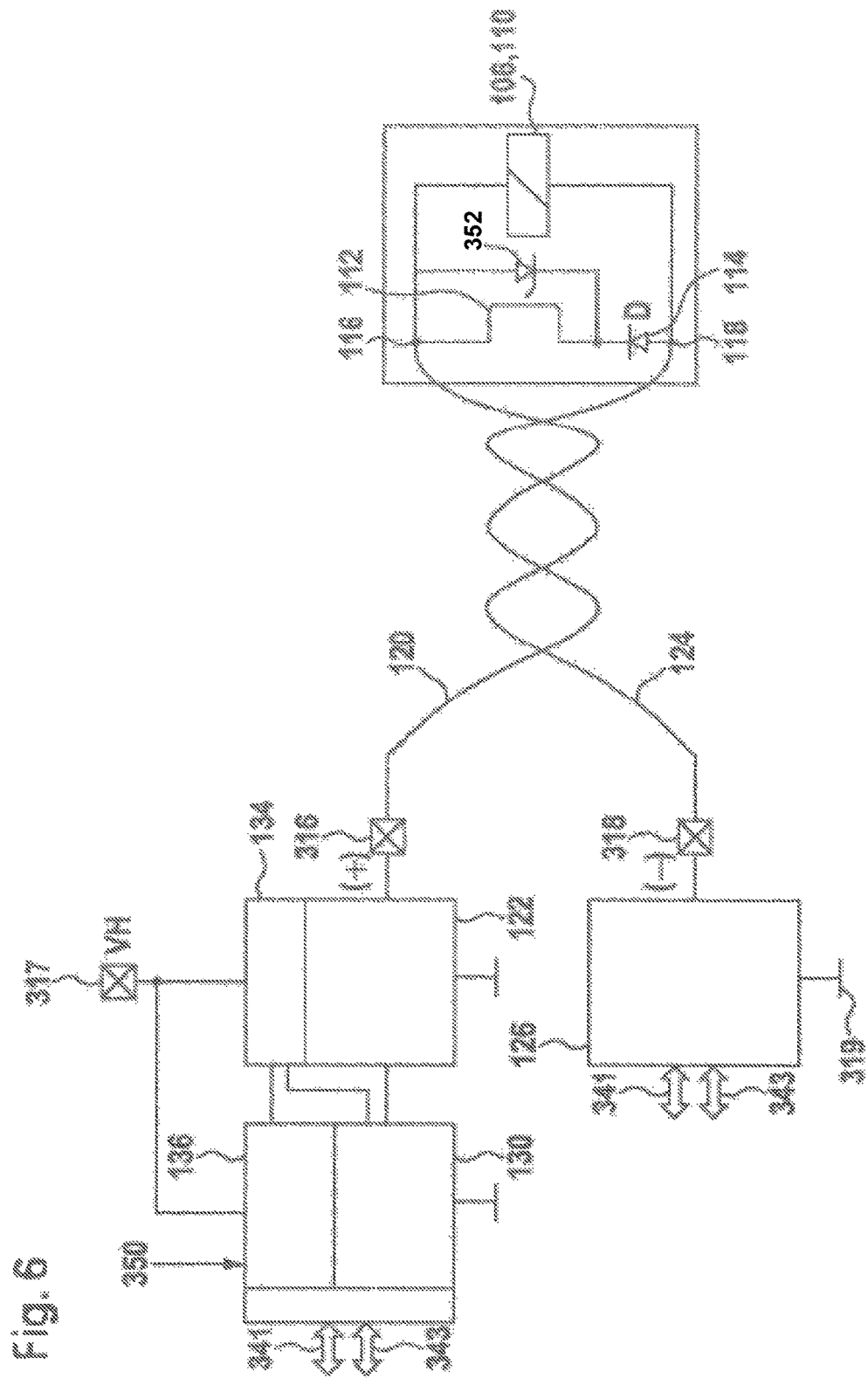
FIG. 6 shows a schematic representation of a device for operating a cold gas generator according to an exemplary embodiment of the present invention.

FIG. 6 shows a schematic representation of an apparatus for operating a cold gas generator according to an exemplary embodiment of the present invention. The apparatus corresponds to that shown in FIG. 3, with the difference that freewheeling diode 352 is now connected parallel to firing device 112. The anode of freewheeling diode 352 is connected to first terminal 116, and the cathode of freewheeling diode 352 is connected to the cathode of diode 114. Diode 114 is thus connected in series to the parallel circuit made up of freewheeling diode 350 and firing device 112.

According to an exemplary embodiment, FIG. 6 shows a two-wire interface for activating the pyrotechnic membrane opening function as well as the valve controlling for adaptive flow control. Here, after activation of firing 112 (interruption) the freewheeling operation of magnetic valve 106 is continued via an external suppressor diode 352. The breakdown voltage of suppressor diode 352 is in the range from 24 to 60 V, typically 27 V. In this way, high-side current regulators 122 can be used whose switching off does not take place using an active gate-to-ground connection, but rather a gate-source connection. Otherwise, the same function exists as in the exemplary embodiment shown in FIG. 3.

FIG. 7 shows a schematic representation of an apparatus for operating a cold gas generator according to an exemplary embodiment of the present invention. The apparatus corresponds to that shown in FIG. 3, with the difference that diode 114 acts as a freewheeling diode. Diode 114 is connected parallel to firing device 112 and parallel to magnetic valve 106, between terminals 116, 118. The cathode of diode 114 is connected to first terminal 116, and the anode of diode 114 is connected to second terminal 118.

According to an exemplary embodiment, FIG. 7 shows a two-wire interface for activating the pyrotechnic membrane opening function as well as the valve controlling for adaptive flow control. Shown is a further low-cost exemplary embodiment in which a firing cap is to be used that interrupts reliably after activation.

This configuration has the advantage of faster activation of the firing cap, because no freewheeling energy of the magnetic valve is required for the firing. The sequence here is firing cap activation with high and low side "ON." With the interruption of the firing, there takes place the significant current buildup in the magnetic valve. After the current value I_ON is reached, the valve opens. In other respects, the statements made in relation to FIG. 3 hold here, the freewheeling operation of the magnetic valve taking place via diode 114.

The exemplary embodiments described and shown in the Figures have been selected only as examples. Different exemplary embodiments can be combined with one another in their entirety or with regard to individual features. It is also possible for an exemplary embodiment to be supplemented with features of a further exemplary embodiment. In addition, method steps according to the present invention can be repeated, and can be carried out in a sequence differing from that described. If an exemplary embodiment includes an "and/or" linkage between a first feature and a second feature, this is to be read as meaning that according to one specific embodiment the exemplary embodiment has both the first feature and the second feature, and according to another specific embodiment the exemplary embodiment has either only the first feature or only the second feature.

What is claimed is:

1. An apparatus for operating a cold gas generator for a safety device for a vehicle, the cold gas generator having a container for storing gas and the container having an outlet opening for the gas closed by a closure element, the apparatus comprising:
a first terminal for a first connecting line for providing a first operating voltage potential;
a second terminal for a second connecting line for providing a second operating voltage potential;
an electrical coil to actuate, in response to a coil current, a closure device to control a flow of gas through the outlet opening, the coil having a first coil contact and a second coil contact and being connected between the first terminal and the second terminal;
a firing device to fire in response to a firing current to open the closure element, the firing device having a first firing contact and a second firing contact and being connected between the first terminal and the second terminal; and
a diode having an anode contact and a cathode contact, the diode being connected between the first terminal and the second terminal.

2. The apparatus of claim 1, wherein the diode and the firing device are connected in series between the second terminal and the first terminal.

3. The apparatus of claim 2, further comprising:
a further diode connected to ground by the anode terminal of the diode between a terminal contact connected to the second connecting line and a device for providing the second operating voltage potential.

4. The apparatus of claim 2, further comprising:
a further diode connected parallel to the firing device and in series to the diode, the anode of the diode being connected to the first firing contact of the firing device and to the first terminal.

5. The apparatus of claim 1, further comprising:
an acquisition device to acquire a value of a current flowing through the first terminal, having a setting device to set the current as a function of the value, and having a determining device to determine a time duration as a function of the value of the current, during which duration the closure element and the closure device release the outlet opening to permit gas to flow out through the outlet opening.

6. The apparatus of claim 5, wherein the setting device is configured to reconnect at least once, in response to an opening signal, the first terminal to the first operating voltage potential via the first connecting line, and the second terminal to the second operating voltage potential via the second connecting line, after the acquired value of the current has fallen below a threshold value for the coil current for actuating the closure device.

7. The apparatus of claim 5, wherein the setting device is configured to:
connect the first terminal to the first operating voltage potential via the first connecting line and to connect the second terminal to the second operating voltage potential via the second connecting line until the acquired value of the current reaches a maximum threshold value; and
separate the first terminal from the first operating voltage potential and the second terminal from the second operating voltage potential after the acquired value of the current has reached the maximum threshold value.

8. The apparatus of claim 7, wherein the coil is configured to provide the firing current for firing the firing device after the acquired value of the current reaches the maximum threshold value, the first terminal has been separated from the first operating voltage potential, and the second terminal has been separated from the second operating voltage potential.

9. The apparatus of claim 1, further comprising a setting device configured to:
connect the first terminal to the first operating voltage potential via the first connecting line and to connect the second terminal to the second operating voltage potential via the second connecting line until a measured current value reaches a maximum threshold value; and
separate the first terminal from the first operating voltage potential and the second terminal from the second operating voltage potential after the measured current value has reached the maximum threshold value.

10. The apparatus of claim 9, wherein the coil is configured to provide the firing current for firing the firing device after the measured current value reaches the maximum threshold value, the first terminal has been separated from the first operating voltage potential, and the second terminal has been separated from the second operating voltage potential.

11. A safety apparatus for a vehicle, comprising:
a cold gas generator having a container for storing gas, the container having an outlet opening for the gas closed by a closure element;
a closure device for controlling a flow of gas through the outlet opening of the container; and
an apparatus for operating the cold gas generator, the apparatus including:

a first terminal for a first connecting line for providing a first operating voltage potential;

a second terminal for a second connecting line for providing a second operating voltage potential;

an electrical coil to actuate, in response to a coil current, the closure device to control a flow of gas through the outlet opening, the coil having a first coil contact and a second coil contact and being connected between the first terminal and the second terminal;

a firing device to fire in response to a firing current to open the closure element, the firing device having a first firing contact and a second firing contact and being connected between the first terminal and the second terminal; and a diode having an anode contact and a cathode contact, the diode being connected between the first terminal and the second terminal.

12. The safety apparatus of claim 11, further comprising:
a bypass that permits a base gas flow rate from the container when the closure element is open.

13. A method for controlling an apparatus for operating a cold gas generator for a safety device for a vehicle, the cold gas generator having a container for storing gas and the container having an outlet opening, closed by a closure element, for the gas, the method comprising:

connecting a first terminal of an apparatus to a first operating voltage potential and a second terminal of the apparatus to a second operating voltage potential to produce a flow of a current between the first terminal and the second terminal, wherein the apparatus includes:

the first terminal for a first connecting line for providing the first operating voltage potential;

the second terminal for a second connecting line for providing the second operating voltage potential;

an electrical coil to actuate, in response to a coil current, a closure device for controlling a flow of gas through the outlet opening, the coil having a first coil contact and a second coil contact and being connected between the first terminal and the second terminal;

a firing device to fire, in response to a firing current, to open the closure element, the firing device having a first firing contact and a second firing contact and being connected between the first terminal and the second terminal;

a diode having an anode contact and a cathode contact, the diode being connected between the first terminal and the second terminal; and separating the first terminal from the first operating voltage potential and the second terminal from the second operating voltage potential after a measured current value has reached a maximum threshold value, to enable a flow of the firing current through the firing device.

14. The method of claim 13, wherein:
the connection is carried out through connection of the first terminal to the first operating voltage potential and of the second terminal to the second operating voltage potential, to produce a flow of a current between the first terminal and the second terminal; and the separation causes commutation of the coil current, enabling the flow through the firing device of the firing current that is sufficient to fire the firing element.

15. The method of claim 14, wherein the connection of the first terminal to the first operating voltage potential and of the second terminal to the second operating voltage potential is galvanic.

16. The method of claim 14, wherein the connection of the first terminal to the first operating voltage potential and of the second terminal to the second operating voltage potential is performed by controlling a high side current regulator and a low side output stage.

17. The method of claim 16, wherein the low side output stage includes a transistor.

18. The method of claim 14, wherein the connection of the first terminal to the first operating voltage potential and of the second terminal to the second operating voltage potential is performed by controlling a first device that connects the first terminal to the first operating voltage potential and a second device that connects the second terminal to the second operating voltage potential.

19. The method of claim 14, wherein the separation is carried out galvanically.

20. The method of claim 14, wherein the separation is carried out through blocking.

21. The method of claim 14, wherein the separation is carried out via control of a connection of a gate terminal to a reference potential of a high-side current regulator and of a connection of a gate terminal to a reference potential of a low-side output stage that includes a transistor.

22. The method of claim 21, wherein the reference potentials are the same as the second operating voltage potential.

23. The method of claim 21, wherein the high-side current regulator connects the first terminal to the first operating voltage potential and the low-side output stage connects the second terminal to the second operating voltage potential.

* * * * *